(12) United States Patent
Suzuki

(10) Patent No.: US 7,385,928 B2
(45) Date of Patent: *Jun. 10, 2008

(54) IMAGE FORMING DEVICE MANAGEMENT SYSTEM AND METHOD

(75) Inventor: Koubun Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 451 days.

This patent is subject to a terminal disclaimer.

(21) Appl. No.: 10/875,398

(22) Filed: Jun. 25, 2004

(65) Prior Publication Data

US 2004/0233854 A1 Nov. 25, 2004

Related U.S. Application Data

(63) Continuation of application No. 09/603,917, filed on Jun. 26, 2000, now Pat. No. 6,775,238.

(30) Foreign Application Priority Data

Jul. 1, 1999 (JP) .................................. 11-187123
Jun. 9, 2000 (JP) ............................. 2000-174345

(51) Int. Cl.
H04L 12/26 (2006.01)

(52) U.S. Cl. ..................................................... 370/242

(58) Field of Classification Search ........ 370/241–245, 370/216, 250; 714/1–4; 709/221–224, 249

See application file for complete search history.

(56) References Cited

U.S. PATENT DOCUMENTS

| | | | |
|---|---|---|---|
| 5,596,390 A | 1/1997 | Sawada | |
| 5,819,110 A | 10/1998 | Motoyama | |
| 5,974,114 A * | 10/1999 | Blum et al. | 379/9 |
| 6,219,718 B1* | 4/2001 | Villalpando | 719/317 |
| 6,363,421 B2* | 3/2002 | Barker et al. | 709/223 |
| 6,446,134 B1* | 9/2002 | Nakamura | 719/313 |
| 6,581,101 B2* | 6/2003 | Villalpando | 709/230 |

FOREIGN PATENT DOCUMENTS

| | | |
|---|---|---|
| JP | 8-30152 | 2/1996 |
| JP | 8-195849 | 7/1996 |
| JP | 8-331267 | 12/1996 |
| JP | 10-217580 | 8/1998 |

* cited by examiner

*Primary Examiner*—Chau T. Nguyen
*Assistant Examiner*—Hicham B Foud
(74) *Attorney, Agent, or Firm*—Oblon, Spivak, McClelland, Maier & Neustadt, P.C.

(57) ABSTRACT

In an image forming device management system and method, a failure in any of a plurality of image forming devices on a first LAN is detected by a management apparatus. A failure message is transmitted from the management apparatus to a center system via a public switched telephone network when the failure is detected, the failure message including a failure code provided to identify the failure. The failure message, transmitted by the management apparatus, is received at the center system. A database of the center system is accessed by using the failure code of the received failure message so as to produce results of the accessing at the center system. A service department ID is extracted from the database based on the accessing results. A service request message is transmitted from the center system to a service department indicated by the service department ID.

20 Claims, 18 Drawing Sheets

FIG.7A

| CUSTOMER ID | CUSTOMER NAME | CUSTOMER ADDRESS | DEPT | PERSON IN CHARGE | PERSON IN CHARGE TEL NO | PERSON IN CHARGE FAX NO | COMM ADAPTER TYPE AND ID |
|---|---|---|---|---|---|---|---|
| XX560 | KKKKK | XXXXXX | DDD | AAAA | XX···X | XX···X<br>012-34-5678 | XX···X<br>99011234 |

FIG.7B

| SALES DEPT | | | | | SERVICE DEPT | | | | |
|---|---|---|---|---|---|---|---|---|---|
| DEPT ID | PERSON | TEL NO | FAX NO | E/MAIL ADDRESS | DEPT ID | PERSON | TEL NO | FAX NO | E/MAIL ADDRESS |
| EEEE | BBBB | XX···X | XX···X | XX···X | FFFF | CCCC | XX···X | XX···X | XX···X |

FIG.8A

| DEVICE GROUP | DEVICE TYPE | DEVICE ID | DATE OF DELIVERY | METHOD OF DELIVERY | CUSTOMER ID | MAINTE CONTRACT |
|---|---|---|---|---|---|---|
| IPSI04500 | XXX | 12345 | 98.10.25 | XX | XXX999 | |

FIG.8B

| FACILITY INFORMATION ||||||
|---|---|---|---|---|---|
| ROM VERSION | DRIVER VERSION | FAILURE HISTORY | PV INFO | MIB INFO | ...... |
| | | | | | |

FIG.9

| FAILURE CODE | FAILURE NAME | SYMPTOMS | CAUSES | REMEDY CODE(a) | REMEDY CODE(b) | REMEDY CODE(c) |
|---|---|---|---|---|---|---|
| XX999 | XX···X | X······X | X·······X | 9999 | 9999 | 9999 |
|  |  |  | X·······X | 9999 | 9999 | 9999 |
|  |  |  | X·······X | 9999 | 9999 | 9999 |
| XX999 | XX···X | X······X | X·······X | 9999 | 9999 | 9999 |
| ··· | ··· | ··· | ··· | ··· | ··· | ··· |

FIG.10

| DEVICE TYPE | DEVICE ID | DATE OF OCCURRENCE | TIME OF OCCURRENCE | FAILURE CODE | REMEDY CODE (1) | REMEDY CODE (2) | REMEDY CODE (3) | ACTION | DEPT RESPONSIBLE |
|---|---|---|---|---|---|---|---|---|---|
| XXX | 1234 | 99/02/01 | 16:40:30 | SC123 | 0101 | 0113 | | DONE | 1001 |
| | | 99/02/08 | 09:12:23 | SC201 | 0200 | | | WAIT | 1001 |
| XXX | 5678 | 99/01/29 | 12:11:04 | SC201 | 0201 | | | DONE | 1135 |

FIG.11A

MESSAGE FORMAT
(IMAGE FORMING DEVICE
→MANAGEMENT APPARATUS)

| DEVICE TYPE | DEVICE ID | OPERATING CONDITION CODE | FAILURE CODE | DATE | TIME | MIB INFORMATION |
|---|---|---|---|---|---|---|

FIG.11B

MESSAGE FORMAT
(MANAGEMENT APPARATUS→CENTER SYSTEM)

| DEVICE TYPE | DEVICE ID | FAILURE CODE | DATE/TIME OF OCCURRENCE | DATE/TIME OF MESSAGE | PERSON IN CHARGE | |
|---|---|---|---|---|---|---|
| | | | | | TEL NO | NAME |

FIG.12

[IMAGE FORMING DEVICE MANAGEMENT]   AUTO OR MANUAL   CURRENT DATE/TIME

| DEVICE TYPE | DEVICE ID | DEVICE ADDRESS | OPERATING CONDITION | SYMPTOMS | DATE OF OCCURRENCE | TIME OF OCCURRENCE | REMARKS |
|---|---|---|---|---|---|---|---|
| NSX50 | 12556 | 115.156 48.006 | PRINT | NORMAL | | | |
| NSX50 | 12559 | 115.156 48.007 | WAIT | NORMAL | | | |
| LP208 | 50363 | 115.156 48.051 | WAIT | NORMAL | | | |
| LP500 | 38664 | 115.156 48.058 | SC405 | DRUM TROUBLE | 99/02/09 | 21:15:18 | MESSAGE SENT 02/09 21:20 |
| LP501 | 40058 | 115.156 48.103 | SPOOL | NORMAL | | | |
| LP501 | 40086 | 115.156 48.106 | JM102 | 2ND TRAY PAPER SUPPLY | 99/02/10 | 08:59:48 | |

159

FORMAT OF
MESSAGE MODE SETTING COMMAND
(CENTER SYSTEM→ MANAGEMENT APPARATUS)

1:AUTO MESSAGE MODE
0:MANUAL MESSAGE MODE

FORMAT OF
MESSAGE DESTINATION SETTING COMMAND
(CENTER SYSTEM→ MANAGEMENT APPARATUS)

TEL    E/MAIL    NETWORK

FORMAT OF DEVICE-TYPE-BASIS MESSAGE
DESTINATION SETTING COMMAND
(CENTER SYSTEM→ MANAGEMENT APPARATUS)

FIG.14

| DEVICE TYPE | MESSAGE DESTINATION TEL NO | MESSAGE DESTINATION E/MAIL ADDRESS | . . . |
|---|---|---|---|
| AA—100<br>AB—310<br>.<br>.<br>. | 03-3456-7890<br>XX·······X | XX·······X<br>XX·······X | |

IMAGE FORMING DEVICE MANAGEMENT SYSTEM AND METHOD

CROSS-REFERENCE TO RELATED APPLICATIONS

This application is a continuation application of Ser. No. 09/603,917 filed Jun. 26, 2000, now U.S. Pat. No. 6,775,238 and claims the benefit of priority from prior Japanese Patent Applications No. 11-187123, filed on Jul. 1, 1999, and No. 2000-174345, filed on Jun. 9, 2000, the entire contents of all of which are incorporated herein by reference.

BACKGROUND OF THE INVENTION

1. Field of the Invention

The present invention relates to an image forming device management system and method which provide remote maintenance of image forming devices, such as copiers, facsimiles and printers, that are installed at customer premises.

2. Description of the Related Art

An image forming device management system in which a center system at a center location provides remote maintenance of a plurality of image forming devices, such as printers, copiers, facsimiles and printing presses, at customer premises through a public switched telephone network (PSTN) is known. For example, Japanese Laid-Open Patent Applications No.8-331267 and No.10-217580 disclose the image forming device management system of this type.

The image forming device management system of the above type generally includes a customer premise system and a center system which are linked together by the PSTN. In the customer premise system, a plurality of image forming devices are connected onto a local area network (LAN) at the customer premises, and a management apparatus for managing the image forming devices is connected onto the LAN. In the center system, a plurality of clients and a server are connected onto a LAN at the central location.

A conventional method for providing remote maintenance of the image forming devices on the LAN, such as failure message or remote parameter setting, requires the installation of an additional communication path (or a wired or non-wired communication line) which is different from the communication path provided for the LAN. Further, in the conventional method, each of the image forming devices on the LAN in the customer premise system requires the addition of a communication interface unit (the hardware or the firmware) which allows the image forming device to be connected to the PSTN.

If a wired communication line is installed in one of the image forming devices in the customer premise system, the cost of the installation of the wired communication line is further needed in addition to the cost of the installation of the LAN. If a non-wired communication line is installed in one of the image forming devices, the image forming device requires the incorporation of a radio device that allows the image forming device to be connected to the PSTN. Both cases will significantly increase the cost of facilities installation and the cost of communications. Further, the restrictions of the installation of the plurality of image forming devices in the customer premise system are accompanied, and such will deteriorate the quality of communication of failure messages between the center system and the customer premise system due to the facilities environment of the customer premise system.

Japanese Laid-Open Patent Application No.8-331267 discloses a remote maintenance method for the image forming devices on the LAN. This remote maintenance method requires the installation of an additional communication path which is different from the communication path provided for the LAN. Further, in this conventional method, each of the image forming devices requires the addition of a communication interface unit which allows the image forming device to be connected to the PSTN. This will significantly increase the cost of facilities installation and the cost of communications.

Further, in the conventional method, when a failure occurs in any of the image forming devices on the LAN, the operator in the customer premise system may perform a local remedy on the failing image forming device by himself, or may notify the center system of the failure by a telephone call. This will place a heavy workload on the operator. It is desired to provide, with low cost and high reliability, remote maintenance of the image forming devices at the customer premises from the center location Further, Japanese Laid-Open Patent Application No.10-217580 discloses a maintenance method for the image forming devices. This maintenance method requires that an electronic mail address provided for sending a service call thereto be maintained with respect to each of the image forming devices. When the updating or maintenance of the e/mail addresses of the individual image forming devices is needed, the workload for the updating or maintenance will be significantly increased and the occurrence of an error of the updating will be highly possible. This will significantly increase the cost of facilities installation and the cost of communications.

FIG. 18 shows the arrangement of a conventional image forming device management system.

As shown in FIG. 18, in the conventional image forming device management system, one of the plurality of image forming devices 100 on the LAN at the customer premises is connected through a communication adapter 200 to the PSTN. In this arrangement, the image forming device 100 of interest generally includes an LAN interface unit (LAN I/F) 100A, a controller (CNTL) 100B, a mechanical unit (MECHA) 100C, and a communication interface unit (COMM I/F) 100D. In order to connect the image forming device 100 through the communication adapter 200 to the PSTN, the image forming device 100 requires the communication interface unit 100D.

In the conventional image forming device management system of FIG. 18, when a management device 300 for management of the plurality of image forming devices 100 is provided on the LAN, it is necessary to newly install another telephone line for the management device 300 that is different from the telephone lines installed for the image forming devices 100 connected through the communication adapters 200 to the PSTN. This will significantly increase the cost of facilities installation and the cost of communications.

SUMMARY OF THE INVENTION

In order to overcome the above-described problems, preferred embodiments of the present invention provide an improved image forming device management system and method that provide, with low cost and high reliability, remote maintenance of the image forming devices at the customer premises from the center location.

An object of the present invention is to provide an image forming device management system that provides, with low cost and high reliability, remote maintenance of the image forming devices at the customer premises from the center location.

Another object of the present invention is to provide a center system for use in an image forming device management system, which provides, with low cost and high reliability, remote maintenance of the image forming devices.

Another object of the present invention is to provide a management apparatus of a customer premise system for use in an image forming device management system, which allows a center system to provide, with low cost and high reliability, remote maintenance of the image forming devices at the customer premises.

Another object of the present invention is to provide an image forming device management method that provides, with low cost and high reliability, remote maintenance of the image forming devices at the customer premises from the center location.

The above-mentioned object of the present invention is achieved by an image forming device management system including a customer premise system and a center system linked by a public switched telephone network PSTN, the customer premise system having a plurality of image forming devices and a management apparatus connected onto a first LAN at customer premises, the center system having one or a plurality of computers connected onto a second LAN at a center location, the image forming device management system including: monitoring means, provided in the management apparatus, for monitoring operating conditions of the image forming devices on the first LAN; storing means, provided in the management apparatus, for storing results of the monitoring of the operating conditions by the monitoring means; failure detecting means, provided in the management apparatus, for detecting a failure in any of the image forming devices on the first LAN; first message means, provided in the management apparatus, for transmitting a failure message to the center system via the PSTN when a failure is detected by the failure detecting means, the failure message including a failure code provided to identify the failure; reading means, provided in the center system, for reading the results of the monitoring of the operating conditions of the image forming devices from the management apparatus; retrieval means, provided in the center system, for receiving the failure message transmitted by the first message means, and for accessing a database of the center system by using the failure code of the received failure message so as to produce results of the accessing; and second message means, provided in the center system, for extracting a service department ID from the database based on the accessing results produced by the retrieval means, and for transmitting a service request message to a service department indicated by the service department ID.

The above-mentioned object of the present invention is achieved by a center system for use in an image forming device management system including a customer premise system and the center system linked by a public switched telephone network PSTN, the customer premise system having a plurality of image forming devices and a management apparatus connected onto a first LAN at customer premises, the center system having one or a plurality of computers connected onto a second LAN at a center location, the center system including: reading means for reading results of monitoring of operating conditions of the image forming devices from the management apparatus; retrieval means for receiving a failure message transmitted by the management apparatus via the PSTN, and for accessing a database of the center system by using a failure code contained in the received failure message so as to produce results of the accessing; and message means for extracting a service department ID from the database based on the accessing results produced by the retrieval means, and for transmitting a service request message to a service department indicated by the service department ID.

The above-mentioned object of the present invention is achieved by a management apparatus for use in an image forming device management system including a customer premise system and a center system linked by a public switched telephone network PSTN, the customer premise system having a plurality of image forming devices and the management apparatus connected onto a first LAN at customer premises, the center system having one or a plurality of computers connected onto a second LAN at a center location, the management apparatus including: monitoring means for monitoring operating conditions of the image forming devices on the first LAN; storing means for storing results of the monitoring of the operating conditions by the monitoring means; failure detecting means for detecting a failure in any of the image forming devices on the first LAN; and message means for transmitting a failure message to the center system via the PSTN when a failure is detected by the failure detecting means, the failure message including a failure code provided to identify the failure.

The above-mentioned object of the present invention is achieved by a management method for an image forming device management system including a customer premise system and a center system linked by a public switched telephone network PSTN, the customer premise system having a plurality of image forming devices and a management apparatus connected onto a first LAN at customer premises, the center system having one or a plurality of computers connected onto a second LAN at a center location, the management method including the steps of: monitoring operating conditions of the image forming devices on the first LAN by the management apparatus; storing results of the monitoring of the operating conditions of the image forming devices; detecting a failure in any of the image forming devices on the first LAN by the management apparatus; transmitting a failure message from the management apparatus to the center system via the PSTN when the failure is detected, the failure message including a failure code provided to identify the failure; reading the monitoring results from the management apparatus by the center system; receiving the failure message, transmitted by the management apparatus, at the center system; accessing a database of the center system by using the failure code of the received failure message so as to produce results of the accessing; extracting a service department ID from the database based on the accessing results; and transmitting a service request message from the center system to a service department indicated by the service department ID.

The image forming device management system and method of the present invention is effective in providing a simple, inexpensive configuration of the system and in carrying out, with high reliability, the remote maintenance of the image forming devices at the user premises from the center location. The image forming device management system of the present invention can provide, with low cost and high reliability, the remote maintenance of the image forming devices.

BRIEF DESCRIPTION OF THE DRAWINGS

Other objects, features and advantages of the present invention will be apparent from the following detailed description when read in conjunction with the accompanying drawings.

FIG. 7A and FIG. 7B are diagrams showing an example of customer records stored in a customer database of the center system in the image forming device management system.

FIG. 8A and FIG. 8B are diagrams showing an example of facility records stored in a facility database of the center system in the image forming device management system.

FIG. 9 is a diagram showing an example of failure records stored in a technical database of the center system in the image forming device management system.

FIG. 10 is a diagram showing an example of failure message records stored in a failure message database of the center system in the image forming device management system.

FIG. 11A and FIG. 11B are diagrams showing the formats of failure messages used by the image forming device management system.

FIG. 12 is a diagram showing an image forming device management list on a display monitor of the management apparatus.

FIG. 14 is a diagram showing an example of a device-type-basis message destination table used in the image forming device management system.

DETAILED DESCRIPTION OF PREFERRED EMBODIMENTS

A description will now be provided of preferred embodiments of the present invention with reference to the accompanying drawings.

Figure 1:
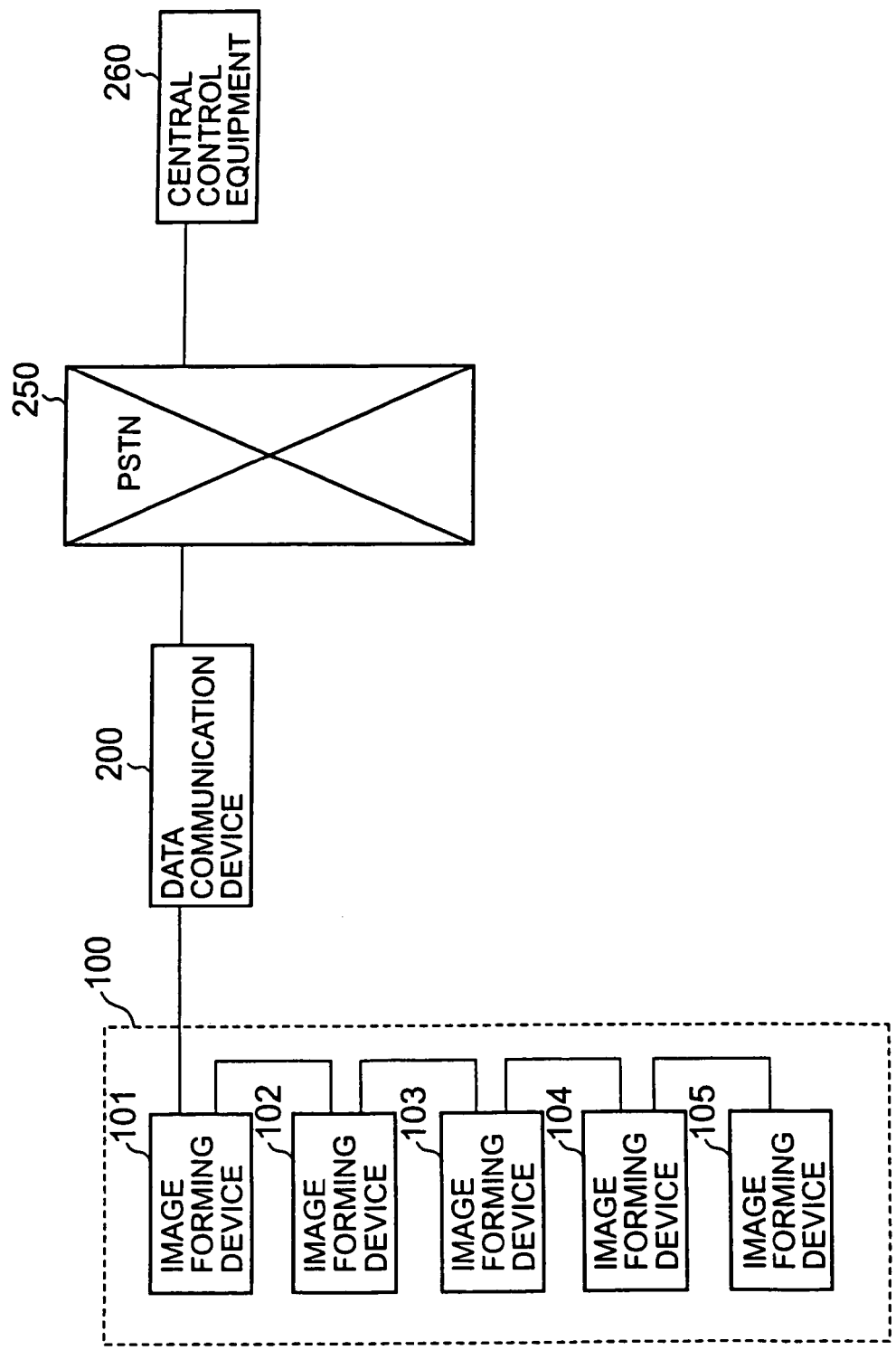
FIG. 1 is a block diagram of an image forming device management system.

FIG. 1 shows the arrangement of an image forming device management system. As shown in FIG. 1, the image forming device management system generally comprises a plurality of image forming devices 101 through 105 (which are also referred to as the image forming devices 100) that are located at the customer premises, a central control equipment 260 that is located at the central location, and a data communication device 200 that is located at the customer premises. The data communication device 200 and the central control equipment 260 are linked together by a public switched telephone network (PSTN) 250. The image forming device management system is configured so that the central control equipment 260 at the central location provides remote maintenance of the image forming devices 100 at the customer premises through the PSTN 250 in a concentrated manner.

In the image forming device management system of FIG. 1, the data communication device 200 receives a command signal from the central control equipment 260 via the PSTN 250, and selectively instructs one of the image forming devices 100 by sending the command signal thereto. Further, the data communication device 200 locally receives various messages from the image forming devices 100, and transmits them to the central control equipment 260 via the PSTN 250. Power is supplied to the data communication device 200 for 24 hours. The data communication device 200 is always operating, even in the nighttime that the power switch of the image forming devices 100 is turned off, so that it provides data communication between the image forming devices 100 and the central control equipment 260.

In the image forming device management system of FIG. 1, the data communication device 200 and the image forming devices 100 are connected together by using a serial communication interface RS-485 cable, and the individual image forming devices 100 are connected onto a multi-drop line from the data communication device 200, as shown in FIG. 1. The data communication device 200 communicates with the image forming devices 100 by performing polling and selecting processes on the multi-drop line. By using the polling and selecting processes, the data communication device 200 monitors the operating conditions of the image forming devices 100 and obtains the monitoring results as to the operating conditions of the image forming devices 100.

Figure 2:
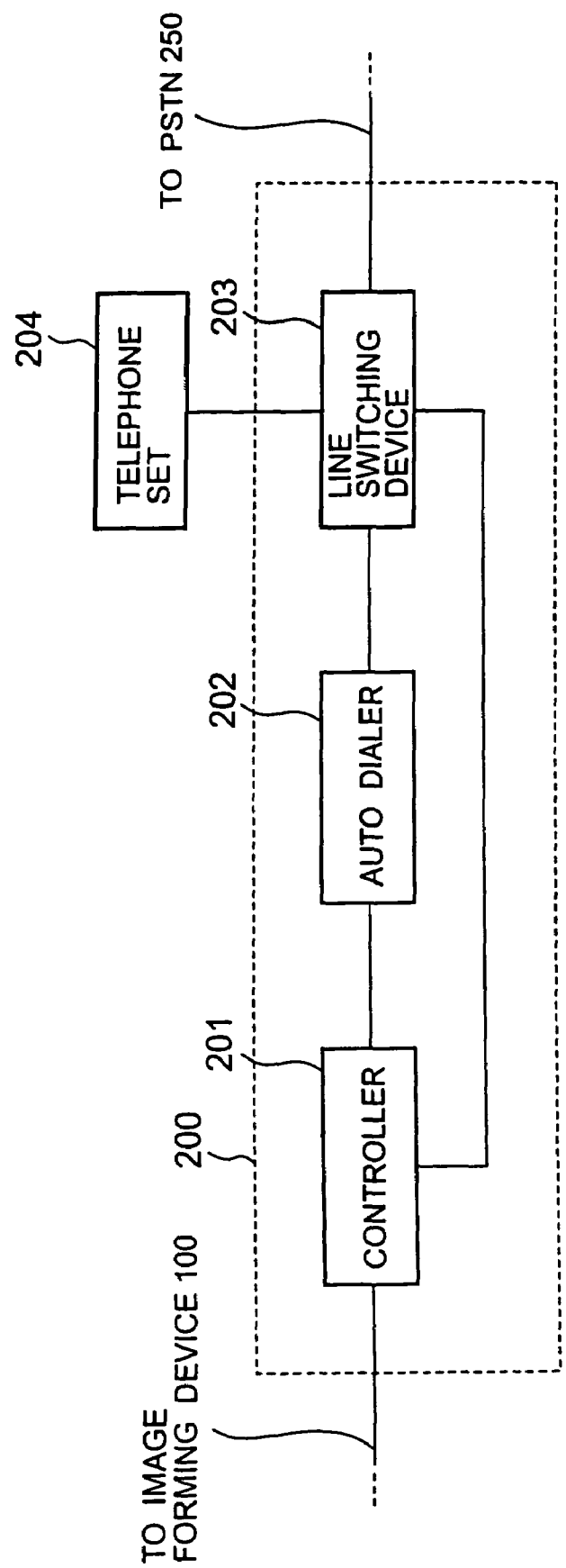
FIG. 2 is a block diagram of a data communication device in the image forming device management system of FIG. 1.

FIG. 2 shows the arrangement of the data communication device 200 in the image forming device management system of FIG. 1. As shown in FIG. 2, the data communication device 200 generally comprises a controller 201, an auto dialer 202, and a line switching device 203. A telephone set 204 is attached to the line switching device 203.

In the data communication device 200 of FIG. 2, the controller 201 sends a control signal to any of the image forming devices 100, and receives a command signal from the central control equipment 260 via the PSTN 250. The auto dialer 202 provides an automatic call to the central control equipment 260 when a certain message sent by the image forming devices 100 is received at the data communication device 200. The line switching device 203 provides a line switching function under the control of the controller 201. In some cases, the line switching device 203 connects the telephone set 204 to the PSTN 250 by disconnecting the auto dialer 202 therefrom, and, in other cases, the line switching device 203 connects the auto dialer 202 to the PSTN 250 by disconnecting the telephone set 204 therefrom.

A detailed configuration of the controller 201 will be omitted from the accompanying drawings, for the sake of simplicity. However, the controller 201 has a configuration that is essentially the same as that of a known microprocessor.

Specifically, the controller 201 generally includes a central processing unit (CPU), a read-only memory (ROM), a random access memory (RAM), a backup random access memory (backup RAM), serial communication control unit, input/output ports, and a real-time clock circuit. A control program is stored in the ROM. The CPU loads the control program, read from the ROM, onto the RAM, and executes various control processes according to the control program. The data processed by the controller 201 is temporarily stored in the RAM. The backup RAM is a nonvolatile memory to which power of a battery is supplied. The clock circuit provides time information including a current date (year, month, day) and a current time (hour, minute, second).

The data and parameters, stored in the backup RAM of the controller 201, include the signals or messages transmitted between the central control equipment 260 and the image forming devices 100, the device codes or device IDs used to identify a specific one of the image forming devices 100, the phone number of the central control equipment 260, the number of retry calls in the event that the connection between the data communication device 200 and the central control equipment 260 is not successfully established, the time interval between retry calls, etc.

The functions provided by the controller 201 include a buffer management function used to temporarily store a received message and process it, a clock control function used to control the device operations based on the time provided by an internal clock IC, a sum check function used to check for an error in the device parameters at the times of power-up and parameter download or at the intervals of one hour, a memory check function used to check for an error in the RAM at the time of power-up or initialization, and an exchange function used to perform call and reception processes. The exchange function is provided, for example, to set the data communication device 200 in an off-hook condition and output a selected phone number when the telephone line is not used, to detect a ringer signal, to set the telephone line in an off-hook condition, and to detect the device ID. The controller 201 is connected to an RS-485 cable extended to the image forming devices 100, and connected to an RS-232C cable extended to a management apparatus. Further, the functions of the controller 201 include a communication control function used to perform the basic communication procedures.

Next, a description will be given of the arrangement of the image forming device management system of the present invention by comparison with the arrangement of the conventional image forming device management system shown in FIG. 18.

Figure 17:
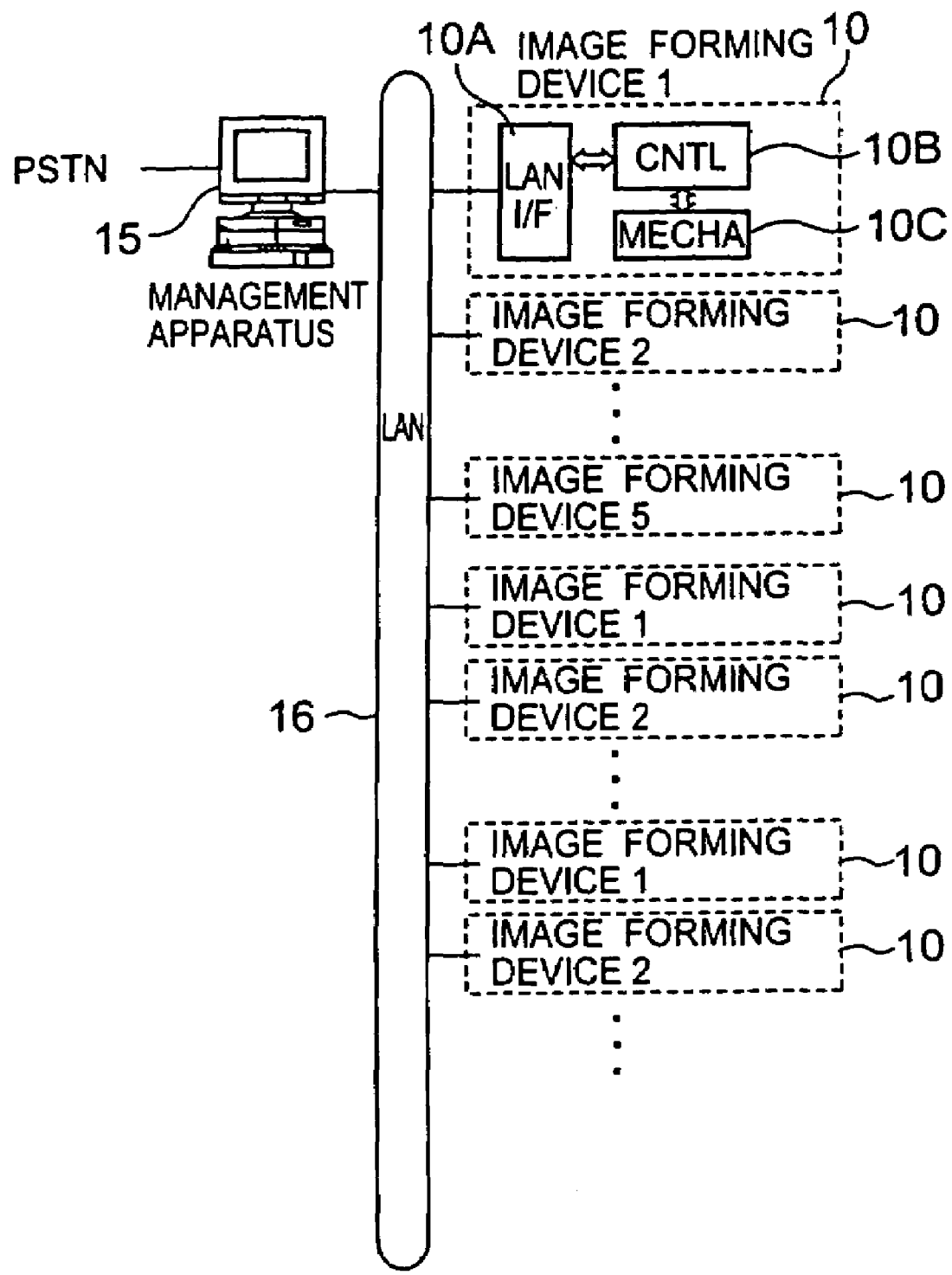
FIG. 17 is a diagram for explaining the arrangement of the image forming device management system according to the invention.

FIG. 17 shows the arrangement of the image forming device management system according to the present invention. As shown in FIG. 17, in the image forming device management system of the invention, each of a plurality of image forming devices 10 on a local area network (LAN) 16 at the customer premises is connected through a management apparatus 15 to the PSTN. In this arrangement, each of the image forming devices 10 generally includes an LAN interface unit (LAN I/F) 10A, a controller (CNTL) 10B, and a mechanical unit (MECHA) 10C. Each image forming device 10 is connected to the management apparatus 15 through the LAN interface unit 10A, and a single telephone line that is provided for the management apparatus 15 is shared by the image forming devices 10 on the LAN 16.

Figure 18:
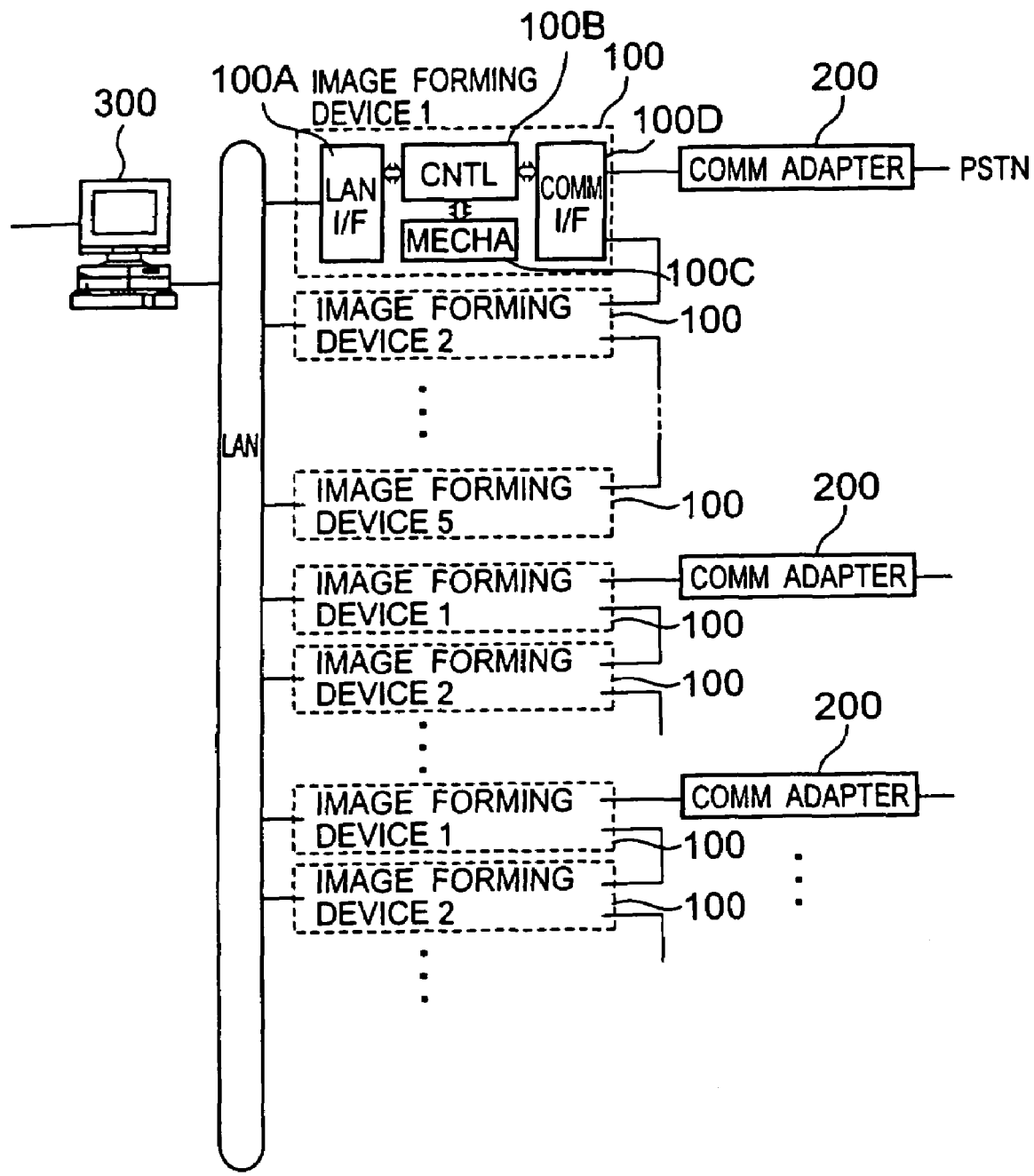
FIG. 18 is a diagram for explaining the arrangement of a conventional image forming device management system.

As the image forming devices 10 on the LAN 16 are connected through the management apparatus 15 to the PSTN in the image forming device management system of the present invention, each image forming device 10 does not require the communication interface unit 100D as in the conventional image forming device management system of FIG. 18. Further, the image forming device management system of the present invention does not require the installation of additional telephone lines for the image forming devices 10 which are different from the telephone line provided for the management apparatus 15.

In the image forming device management system of FIG. 17, the management apparatus 15 is provided on the LAN 16, and the image forming devices 10 on the LAN 16 are connected through the management apparatus 16 to the PSTN. In order for a center system at a central location to provide remote maintenance of the image forming devices 10 at the customer premises through the PSTN, it is not necessary to install additional telephone lines for the image forming devices 10 that are different from the telephone line provided for the management apparatus 15. Accordingly, it is possible for the image forming device management system of the invention to provide, with low cost and high reliability, remote maintenance of the image forming devices 10 at the customer premises.

Figure 3:
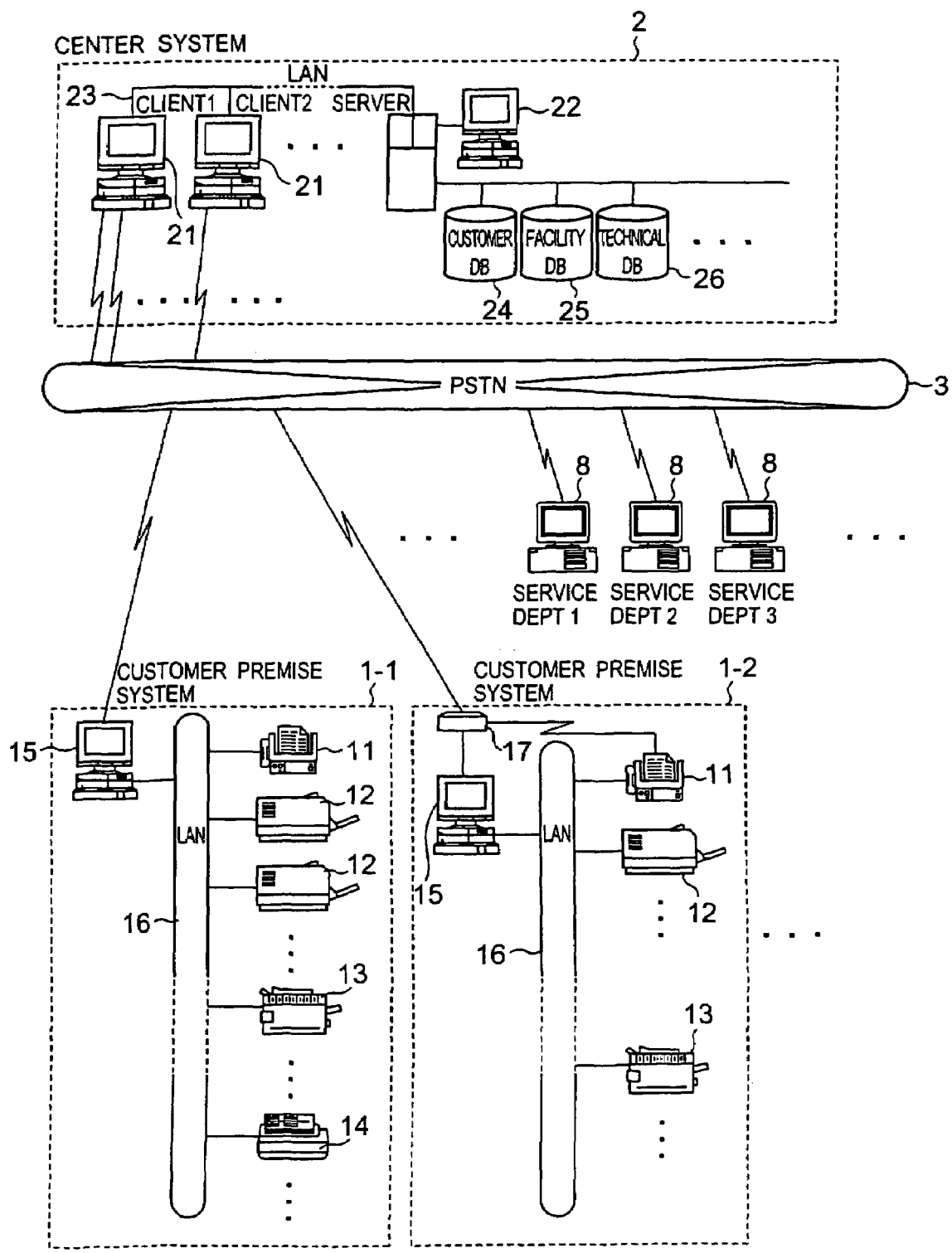
FIG. 3 is a diagram showing one preferred embodiment of the image forming device management system of the present invention.

FIG. 3 shows one preferred embodiment of the image forming device management system of the present invention.

In the image forming device management system shown in FIG. 3, a plurality of customer premise systems 1-1, 1-2, . . . (which are also referred to as the customer premise systems 1) and a center system 2 at the central location are linked by the public switched telephone network (PSTN) 3, and the center system 2 and a plurality of service departments 8 (including a service department1, a service department2, . . . ) are linked by the PSTN 3.

Figure 15:
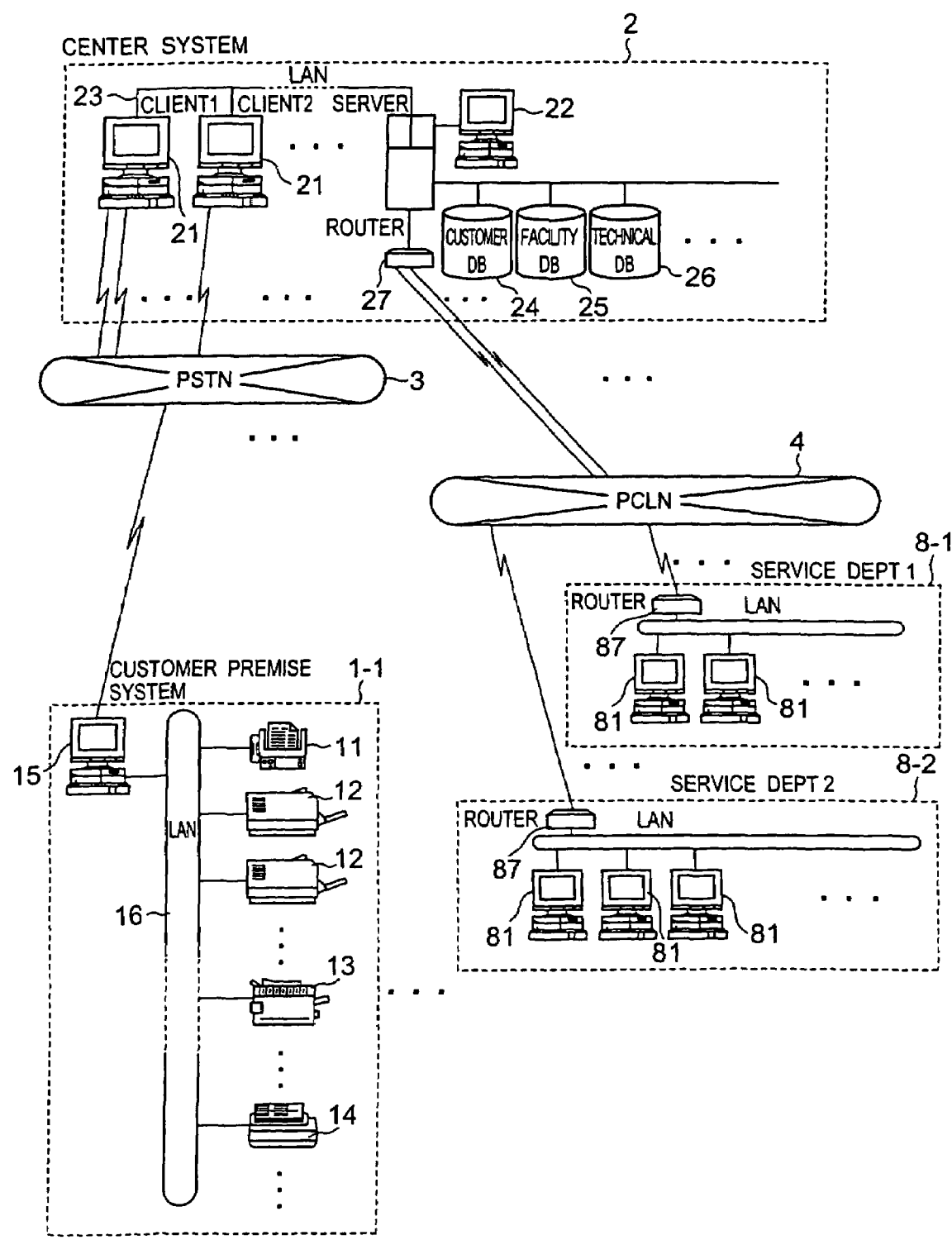
FIG. 15 is a diagram showing another preferred embodiment of the image forming device management system of the invention.

FIG. 15 shows another preferred embodiment of the image forming device management system of the present invention.

In the image forming device management system shown in FIG. 15, the plurality of customer premise systems 1-1 at the customer premises and the center system 2 at the central location are linked by the PSTN 3, and the center system 2 and a plurality of service departments 8-1, 8-2, . . . (which are also called the service departments 8) at service locations are linked by a private communication line network (PCLN) 4.

Next, a description will be provided of the configuration of the image forming device management system shown in FIG. 3.

As shown in FIG. 3, each of the customer premise systems 1 (including a customer premise system 1-1 and a customer premise system 1-2) generally comprises a plurality of image forming devices 10 (including facsimiles 11, printers 12, copiers 13 and printing presses 14) and a management apparatus 15 which are all connected onto a first LAN 16. The image forming devices 10 are connected through the management apparatus 15 to the PSTN 3. Some of the customer premise systems 1 (such as the customer premise system 1-2) further include a communication adapter 17 which is connected to both the facsimile 11 and the management apparatus 15. In this arrangement, the management apparatus 15 is connected through the communication adapter 17 to the PSTN 3, and the telephone line, which provided for the facsimile 11 to connect to the PSTN 3, is shared with the management apparatus 15 by using the communication adapter 17. There is no need for providing an additional telephone line for the management apparatus 15 which is different from the telephone line for the facsimile 11.

In the customer premise systems 1, a plurality of computers (including the server and the clients) may be connected onto the LAN 16. However, in the embodiment of FIG. 3, such computers on the LAN 16 will be omitted for the sake of simplicity.

In the image forming device management system of FIG. 3, the center system 2 generally comprises a plurality of clients 21 (such as a client1, a client2, etc.) and a server 22 which are all connected onto a second LAN 23 of the center system 2. The server 22 generally includes a customer database (CUSTOMER DB) 24, a facility database (FACILITY DB) 25, and a technical database (TECHNICAL DB) 26 which are connected to the server 22. As described above, the center system 2 at the central location and the plurality of service departments 8 at the service locations are linked by the PSTN 3. The data communication between the center system 2 and one of the service departments 8 can be achieved by establishing the connection between the center system 2 and the one of the service departments 8 via the PSTN 3.

Figure 4:
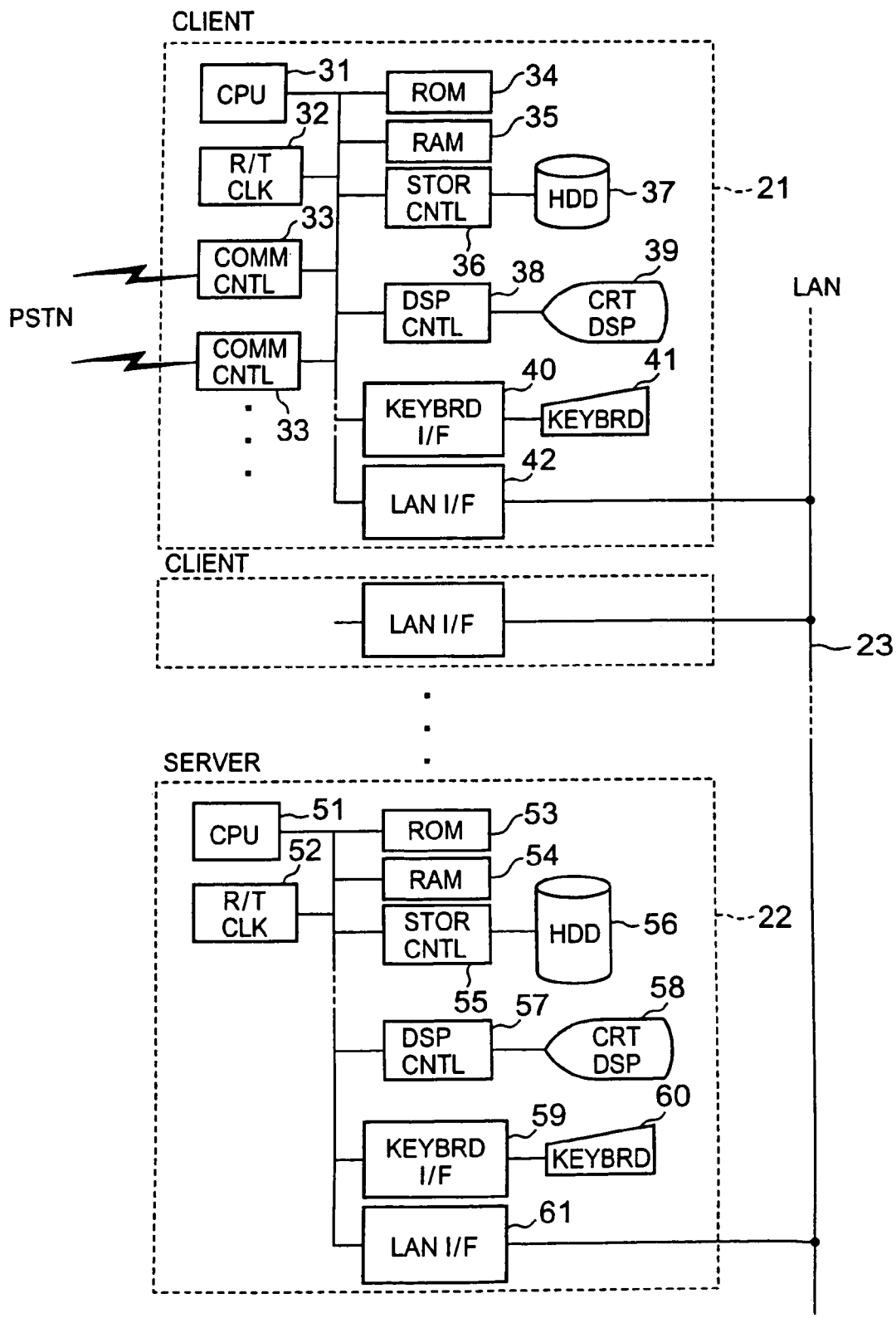
FIG. 4 is a block diagram of a client and a server in a center system of the image forming device management system.

FIG. 4 shows the arrangement of the client 21 and the server 22 in the center system 2 of the image forming device management system of FIG. 3.

As shown in FIG. 4, the client 21 generally comprises a central processing unit (CPU) 31, a real-time clock circuit (R/T CLK) 32, communication control units (COMM CNTL) 33, a read-only memory (ROM) 34, a random access memory (RAM) 35, a storage control unit (STOR CNTL) 36, a hard disk drive (HDD) 37, a display control unit (DSP CNTL) 38, a cathode-ray tube display monitor (CRT DSP) 39, a keyboard interface unit (KEYBRD I/F) 40, a keyboard (KEYBRD) 41, and a LAN interface unit (LAN I/F) 42. The client 21 is connected through the communication control units 33 to the PSTN 3. The client 21 is connected through the LAN interface unit 42 to the LAN 23.

Further, as shown in FIG. 4, the server 22 generally comprises a central processing unit (CPU) 51, a real-time clock circuit (R/T CLK) 52, a read-only memory (ROM) 53, a random access memory (RAM) 54, a storage control unit (STOR CNTL) 55, a hard disk drive (HDD) 56, a display control unit (DSP CNTL) 57, a cathode-ray tube display monitor (CRT DSP) 58, a keyboard interface unit (KEYBRD I/F) 59, a keyboard (KEYBRD) 60, and a LAN interface unit (LAN I/F) 61. The server 22 is connected through the LAN interface unit 61 to the LAN 23.

In the embodiment of FIG. 15, the central system 2 includes the server 22, and the server 22 in this embodiment further includes a router 27 connected to the private communication line network (PCLN) 4. Hence, the server 22 of the central system 2 in this embodiment is connected through the router 27 to the PCLN 4. The server 22 of the center system 2 at the central location and the plurality of service departments 8 at the service locations are linked together by the PCLN 4. The data communication between the center system 2 and one of the service departments 8 can be achieved by establishing the connection between the center system 2 and the one of the service departments 8 via the PCLN 4.

Figure 5:
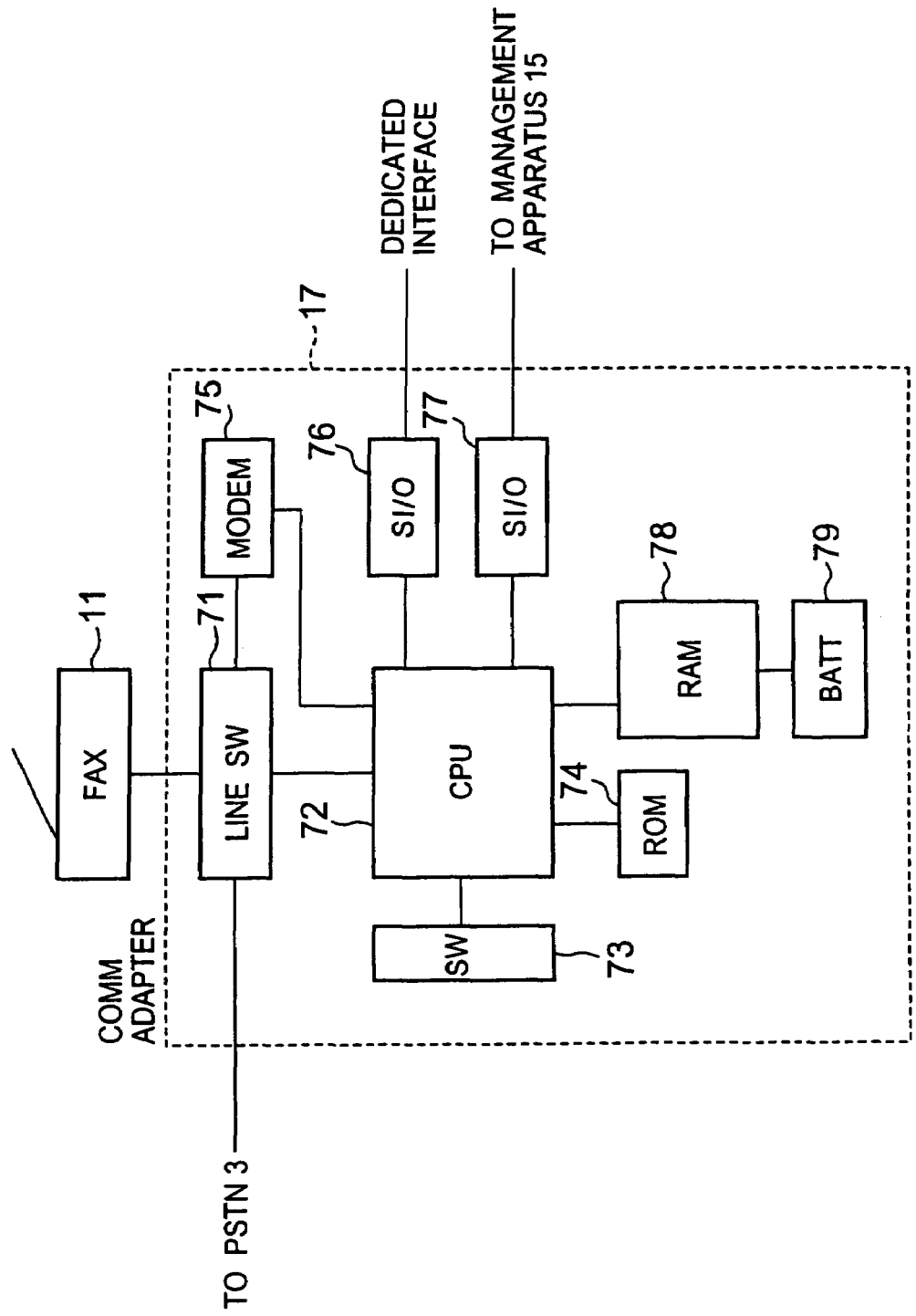
FIG. 5 is a block diagram of a communication adapter in a customer premise system of the image forming device management system.

FIG. 5 shows the communication adapter 17 in the customer premise system 1-2 of the image forming device management system of FIG. 3.

As shown in FIG. 5, the communication adapter 17 generally comprises a line switching device (LINE SW) 71, a central processing unit (CPU) 72, a switch (SW) 73, a read-only memory (ROM) 74, a modem 75, an input/output interface (S I/O) 76, an input/output interface (S I/O) 77, a random access memory (RAM) 78, and a battery (BATT) 79. The communication adapter 17 is connected through the S I/O 76 to a dedicated interface (not shown). The communication adapter 17 is connected through the S I/O 77 to the management apparatus 15 of the customer premise system 1-2.

Further, in the communication adapter 17 of FIG. 5, the facsimile 11 on the LAN 16 is connected to the line switching device 71. The telephone line from the PSTN 3 is connected to the line switching device 71 of the communication adapter 17. Hence, the management apparatus 15 of the customer premise system 1-2 is connected through the communication adapter 17 to the PSTN 3 in the image forming device management system shown in FIG. 3.

As previously described, in the image forming device management system shown in FIG. 15, the server 22 of the central system 2 in this embodiment is connected through the router 27 to the PCLN 4. The plurality of service departments 8 (such as the service departments 8-1, 8-2, etc.) respectively include a router 87 and a number of computers 81 that are connected onto the LAN. Each of the plurality of service departments 8 is connected through the router 87 to the PCLN 4. Accordingly, in the embodiment of FIG. 15, the server 22 of the center system 2 at the central location and the plurality of service departments 8 at the service locations are linked together by the PCLN 4. The data communication between the center system 2 and one of the service departments 8 can be achieved by establishing the connection between the center system 2 and the one of the service departments 8 via the PCLN 4.

Figure 16:
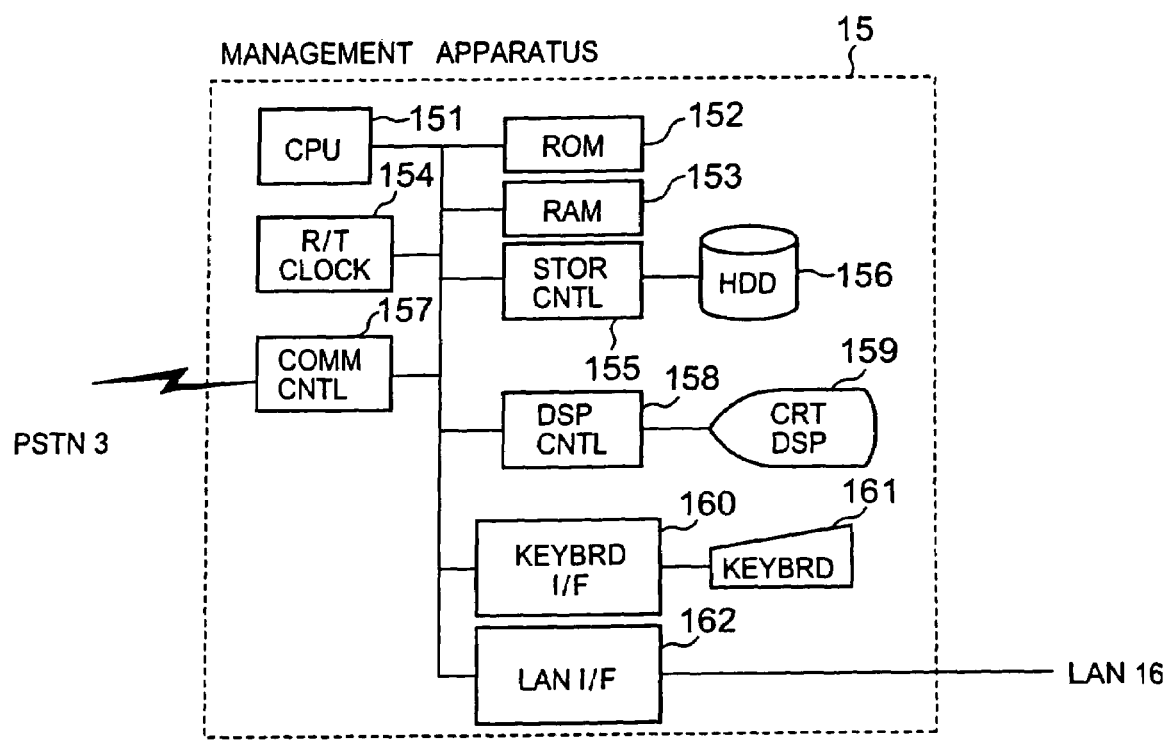
FIG. 16 is a block diagram of a management apparatus in the customer premise system of the image forming device management system.

Next, FIG. 16 shows the arrangement of the management apparatus 15 in the customer premise system 1 of the image forming device management system of FIG. 3.

As shown in FIG. 16, the management apparatus 15 generally comprises a central processing unit (CPU) 151, a read-only memory (ROM) 152, a random access memory (RAM) 153, a real-time clock circuit (R/T CLK) 154, a storage control unit (STOR CNTL) 155, a hard disk drive (HDD) 156, a communication control unit (COMM CNTL) 157, a display control unit (DSP CNTL) 158, a cathode-ray tube display monitor (CRT DSP) 159, a keyboard interface unit (KEYBRD I/F) 160, a keyboard (KEYBRD) 161, and a LAN interface unit (LAN I/F) 162. The management apparatus 15 is connected through the communication control unit 157 to the PSTN 3. The management apparatus 15 is connected through the LAN interface unit 162 to the LAN 16 of the customer premise system 1.

Figure 6:
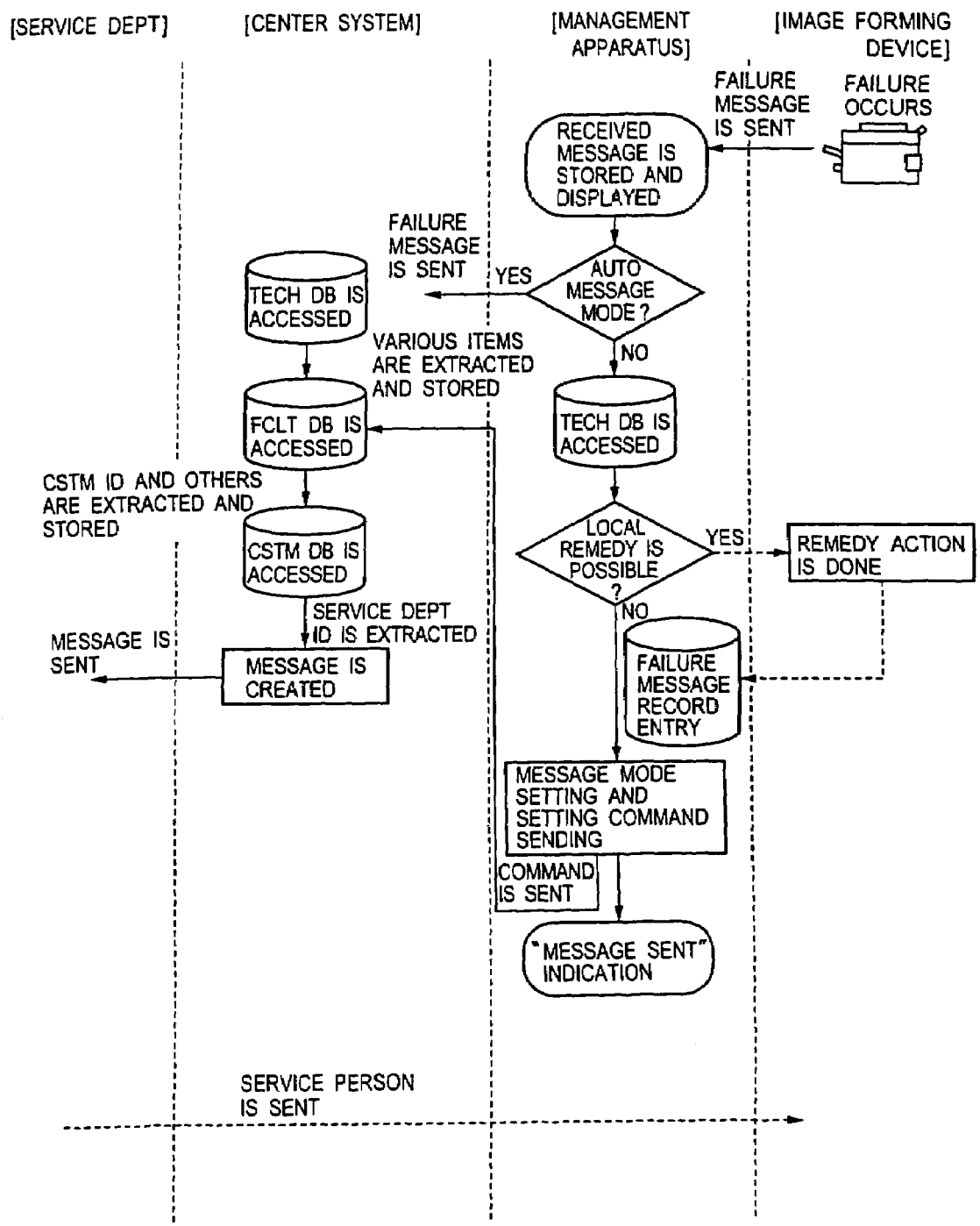
FIG. 6 is a diagram for explaining a remote maintenance process of the image forming device management system.

Next, a description will be provided of a remote maintenance process executed by the image forming device management system of FIG. 3. FIG. 6 shows the remote maintenance process of the image forming device management system of FIG. 3.

As described above, in the center system 2, the customer database 24 storing a set of customer records that are concerned with the remote maintenance of the center system 2, the facility database 25 storing a set of facility records that are concerned with the remote maintenance of the center system 2, and the technical database 26 storing a set of failure records that are pertinent to the image forming devices 100 in the image forming device management system are provided in advance.

FIG. 7A and FIG. 7B show an example of customer records stored in the customer database 24 of the image forming device management system of FIG. 3. As shown in FIG. 7A and FIG. 7B, each of the customer records, stored in the customer database 24, includes a customer identification field (CUSTOMER ID), a customer name field, a customer address field, a customer department field, a responsible person name field, a telephone number field, a facsimile number field, a communication adapter type and identification field, a sales department identification field (DEPT ID), a service department identification field (DEPT ID), etc. The customer database 24 is provided for the center system 2 to identify a service department ID of the relevant record among the stored customer records from an extracted customer ID.

FIG. 8A and FIG. 8B show an example of facility records stored in the facility database 25 of the image forming device management system of FIG. 3. As shown in FIG. 8A and FIG. 8B, each of the facility records, stored in the facility database 25, includes a device group field, a device type field (DEVICE TYPE), a device identification field (DEVICE ID), a delivery date field, a delivery method field, a customer identification field (CUSTOMER ID), a maintenance contract field, another facility information field, etc. The facility database 25 is provided for the center system 2 to identify a customer ID of the relevant record among the stored facility records from a specific device type and device ID of a received failure message.

FIG. 9 shows an example of failure records stored in the technical database 26 of the image forming device management system of FIG. 3. As shown in FIG. 9, each of the failure records, stored in the failure database 26, includes a failure code field (FAILURE CODE), a failure name field, a symptoms field, a causes field, a plurality of remedy code fields (REMEDY CODE (a), REMEDY CODE (b), REMEDY CODE (c)), etc. The failure database 26 is provided for the center system 2 to identify one or a plurality of causes and remedy codes of the relevant record among the stored failure records from a specific failure code of a received failure message.

As shown in FIG. 6, when a failure (such as lack of paper, paper jam, lack of toner, a malfunction, etc.) has occurred in one of the image forming devices 10 (such as the facsimile 11, the printer 12, the copier 13 or the printing press 14), the image forming device management system of the present embodiment starts execution of the remote maintenance process. The failing image forming device 10 automatically transmits a failure message (shown in FIG. 11A) to the management device 15 via the LAN interface unit 162. FIG. 11A shows the format of the failure message sent from the image forming device 10 to the management apparatus 15 in the image forming device management system of FIG. 3. As shown in FIG. 11A, the failure message generally includes a device type of the image forming device 10, a device ID of the image forming device 10, an operating condition code of the image forming device 10, a failure code, an occurrence date, an occurrence time, and a management information base (MIB) information. The MIB information, contained in the failure message, is an operation status management date item which is supplied by the controller 10B or the LAN interface unit 10A of the image forming device 10. The MIB information is supplied from each of the image forming devices 10 to the management apparatus 15 for the purpose of management of the operation status of each image forming device 10.

In the management apparatus 15, a control program for managing the LAN resources and the image forming devices 10 on the LAN 16 (which will be referred to as the image forming device management program) is always running on the RAM 153. By performing the polling process under the control of the image forming device management program, the management apparatus 15 determines whether any of the image forming devices 10 on the LAN 16 is waiting for sending a failure message to the management apparatus 15. By using the polling process, the management apparatus 15 monitors the operating conditions of the individual image forming devices 10 and obtains the monitoring results as to the operating conditions of the image forming devices 10. During the remote maintenance process, the management apparatus 15 displays an image forming device management list on the display monitor 159 under the control of the image forming device management program.

FIG. 12 shows the image forming device management list on the display monitor 159 of the management apparatus 15. As described above with reference to FIG. 6, when the failure message (the format of which is shown in FIG. 11A), sent by the image forming device 10, is received at the management apparatus 15, the management apparatus 15 immediately stores the failure message and displays the data items of the received failure message in the management list on the display monitor 159 as shown in FIG. 12.

In the example of FIG. 12, the image forming device management list indicates that a second tray paper supply problem has occurred in the image forming device having the device type "LP501" and the device ID "40086", and that a drum trouble has occurred in the image forming device having the device type "LP500" and the device ID "38664". In the "REMARKS" column of the former failure record of the management list, the "message sent" indicator is set in ON state, which means that the related failure message is already sent to the center system 2 by the management apparatus 15. In the "REMARKS" column of the latter failure record of the management list, the "message sent" is set in OFF state, which means that the related failure message is not yet sent to the center system 2 by the management apparatus 15.

Further, in the example of FIG. 12, an auto or manual message mode indicator is displayed on the monitor 159 together with the image forming device management list. The message mode indicator is selectively set to one of the auto message mode or the manual message mode in accordance with the operator's manual operation or the center system's setting command, which is useful to inform the operator which of the auto message mode or the manual message mode is currently selected by the management apparatus 15.

Further, in the example of FIG. 12, a current date/time indicator is also displayed on the monitor 159 together with the image forming device management list. The current date/time indicator is useful to inform the operator of the current date and time supplied by the real-time clock circuit 154.

As shown in FIG. 6, when the management apparatus 15 is set in the auto message mode, the management apparatus 15 automatically transmits a failure message (shown in FIG. 11B) to the center system 2 via the PSTN 3.

FIG. 11B shows the format of the failure message sent from the management apparatus 15 to the center system 2 in the image forming device management system of FIG. 3. As shown in FIG. 11B, the failure message generally includes a device type of the image forming device 10, a device ID of the image forming device 10, a failure code, an occurrence date, an occurrence time, and a responsible person's telephone number and name.

As shown in FIG. 6, when the failure message, sent by the management apparatus 15, is received at the center system 2, the center system 2 accesses the technical database 26 (shown in FIG. 9) by using the specific failure code of the received failure message as the keyword. From the failure record that matches with the specific failure code among the stored failure records of the technical database 26, the center system 2 extracts the failure name, the symptoms, the causes, and the remedy codes (a), (b) and (c), and stores all the extracted data items.

Next, the center system 2 accesses the facility database 25 (shown in FIG. 8A and FIG. 8B) by using the specific device type and device ID of the received failure message as the keyword. From the facility record that matches with the specific device type and device ID among the stored facility records of the facility database 25, the center system 2 extracts the customer ID and other data items, and stores all the extracted data items.

Further, the center system 2 accesses the customer database 24 (shown in FIG. 7A and FIG. 7B) by using the extracted customer ID as the keyword. From the customer record that matches with the specific customer ID among the stored customer records of the customer database 24, the center system 2 extracts the service department ID. The extracted service department ID is used to identify a specific one of the plurality of service departments 8 in the image forming device management system that is responsible for servicing the failing image forming device 10. Then, the center system 2 creates a service request message including the received failure message data items and the extracted data items (including the failure name, the symptoms, the causes, the remedy codes and others) in a predetermined format (either a fax format or an electronic mail format), and transmits the created message to the service department 8 (whose location is identified by the extracted service department ID) via the PSTN 3 (or via the PCLN 4).

Further, in the center system 2, a failure message database (not shown in FIG. 3) which stores failure message records concerning the history of the failures of the image forming devices 10 is provided, in addition to the customer database 24, the facility database 25 and the technical database 26.

FIG. 10 shows an example of failure message records stored in the failure message database of the center system 2 in the image forming device management system of FIG. 3. As shown in FIG. 10, each of the failure message records, stored in the failure message database, generally includes a device type field, a device ID field, an occurrence date field, an occurrence time field, a failure code field, a remedy code field, an action field, and a responsible department field. The failure message database is provided for the center system 2 to identify one of the plurality of failure messages that have been received from the image forming devices 10 at the center system 2.

Further, as shown in FIG. 6, when the service request message (in the fax format or the e/mail format), sent by the center system 2, is received at the service department 8, the service department 9 takes necessary actions for eliminating the failure of the image forming device 10 based on the contents of the received message. As needed, the service department 8 will send a service person to the location of the failing image forming device 10.

Next, a description will be given of the manual message mode of the management apparatus 15 in another preferred embodiment of the image forming device management system of the invention. In the manual message mode, the management apparatus 15 transmits a failure message to the center system 2 via the PSTN 3 after a manual message sending operation is performed on the management apparatus 15 by the operator.

When the management apparatus 15 is set in the manual message mode, the management apparatus 15 and the operator carry out the following operations.

When a failure message sent by the failing image forming device 10 is received at the management apparatus 15, the management apparatus 15 immediately displays the data items of the received message in the image forming device management list on the display monitor 159. The data items related to the failing image forming device in the management list on the display monitor 159 (corresponding to the received message) is set, at this time, in a red-color state (or a blinking or high-lighted state), which is noticeable to the operator on the management apparatus 15. The operator performs, for example, a manual retrieval operation on the management apparatus 15 to access the technical database 26 of the center system 2 through the PSTN 3 by using the failure code of the received failure message as the keyword, and obtains the retrieval results from the center system 2. Then, the operator determines whether a local remedy against the failure of the image forming device within the customer premise system 1 is possible, based on the retrieval results.

When it is determined that the local remedy is possible, the operator either performs necessary operations on the management apparatus 15 so as to take the remedy action on the image forming device 10, or directly performs the remedy action on the image forming device. The operations performed on the management apparatus 15 by the operator may include the analysis of the causes of the failure, the downloading of the driver or the firmware from the manufacturer of the image forming device, or the testing of the operation of the image forming device.

As shown in FIG. 6, the operation status of the image forming device 10 after the remedy action is taken is stored in the management apparatus 15. The operator can perform a manual operation on the management apparatus 15 so as to transmit a failure message to the center system 2 in order for recording the failure message in the failure message database.

On the other hand, when it is determined that making a service request to the service department 8, rather than performing the local remedy, is necessary, the operator performs a manual operation on the management apparatus 15 so as to send the failure message (the format of which is shown in FIG. 11B) to the center system 2 via the PSTN 3.

In the management apparatus 15, the telephone number of the failure message destination, the fax number thereof, the e/mail address thereof, the network address thereof and/or the "http" (hypertext transfer protocol) address thereof are preset, and they can be modified to new setting data. Also, in the management apparatus 15, the method of sending the failure message to the destination is preset, and it can be modified to a new setting data. After the failure message is transmitted from the management apparatus 15 to the center system 2, the "message sent" indicator of the failure message of concern on the display monitor 159 is set in ON state.

Next, a description will be provided of the auto message mode of the management apparatus 15 in another preferred embodiment of the image forming device management system of the invention. In the auto message mode, the management apparatus 15 automatically transmits a failure message to the center system 2 via the PSTN 3 upon occurrence of a failure in any of the image forming devices 10 on the LAN 16.

When the management apparatus 15 is set in the auto message mode, the management apparatus 15 carries out the following operations.

When a first failure message (the format of which is shown in FIG. 11A) sent by the failing image forming device 10 is received at the management apparatus 15, the management apparatus 15 adds, to the received message, the message transmission date and time, and the responsible person's telephone number and name, and creates a second failure message (the format of which is shown in FIG. 11B). Then, the management apparatus 15 automatically transmits the second failure message to the center system 2 via the PSTN 3.

Next, a description will be provided of a message mode setting command which is transmitted from the center system 2 to the management apparatus 15 in another preferred embodiment of the image forming device management system of the invention.

In the present embodiment, the message mode setting of the management apparatus 15 can be changed from the auto message mode to the manual message mode, and vice versa, in accordance with either the operator's manual operation that is locally performed on the management apparatus 15, or the center system's message mode setting command that is remotely sent to the management apparatus 15.

Figure 13A:
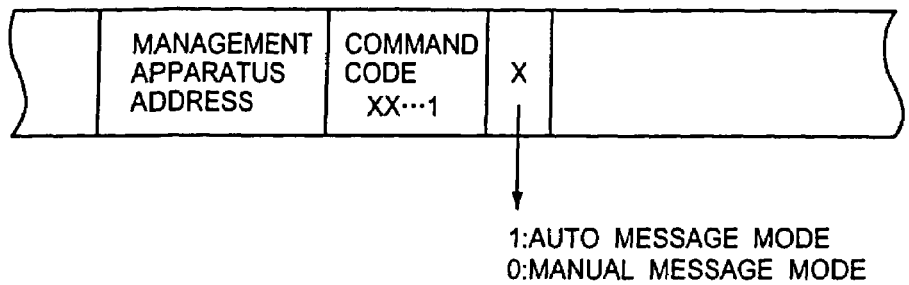
FIG. 13A, FIG. 13B and FIG. 13C are diagrams showing the formats of management apparatus parameter setting commands used in the image forming device management system.

FIG. 13A shows the format of a message mode setting command which is remotely transmitted from the center system 2 to the management apparatus 15. As shown in FIG. 13A, the setting command includes a command code "XX . . . 1", which represents the message mode setting command. A secondary code "X", following the command code, in the setting command represents one of the auto message mode ("1") or the manual message mode ("0").

Alternatively, as described above, the message mode setting of the management apparatus 15 may be changed between the auto message mode and the manual message mode in accordance with the operator's manual operation that is locally performed on the management apparatus 15.

The above feature of the present embodiment is useful to inform the operator which of the auto message mode or the manual message mode is currently selected by the image forming device management program.

Next, a description will be provided of a message destination setting command which is transmitted from the center system 2 to the management apparatus 15 in another preferred embodiment of the image forming device management system of the invention.

In the present embodiment, the message destination setting of the management apparatus 15 can be changed from a stored message destination number to a new message destination number in accordance with either the operator's manual operation that is locally performed on the management apparatus 15, or the center system's message destination setting command that is remotely sent to the management apparatus 15.

Figure 13B:
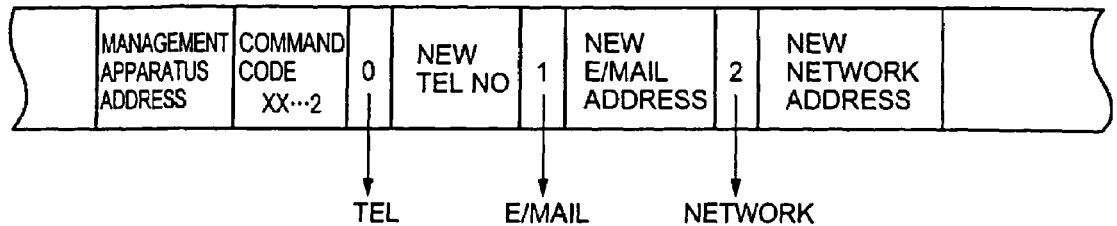

FIG. 13B shows the format of a message destination setting command which is remotely transmitted from the center system 2 to the management apparatus 15. As shown in FIG. 13B, the setting command includes a command code "XX . . . 2", which represents the message destination setting command. A secondary code "X", following the command code, in the setting command represents one of the new message destination telephone number ("0"), the new message destination e/mail address ("1"), or the new message destination network address ("2").

Alternatively, as described above, the message destination setting of the management apparatus 15 may be changed from the stored message destination number to a new message destination number in accordance with the operator's manual operation that is locally performed on the management apparatus 15.

The above feature of the present embodiment is useful to provide flexibility in updating the parameter of the remote maintenance of the image forming devices, which is currently selected by the image forming device management program.

Next, a description will be provided of a device-type-basis message destination setting command which is transmitted from the center system 2 to the management apparatus 15 in another preferred embodiment of the image forming device management system of the invention.

In the present embodiment, the device-type-basis message destination setting of the management apparatus 15 can be changed from stored device-type-basis message destination numbers to new device-type-basis message destination numbers in accordance with either the operator's manual operation that is locally performed on the management apparatus 15, or the center system's device-type-basis message destination setting command that is remotely sent to the management apparatus 15.

Figure 13C:
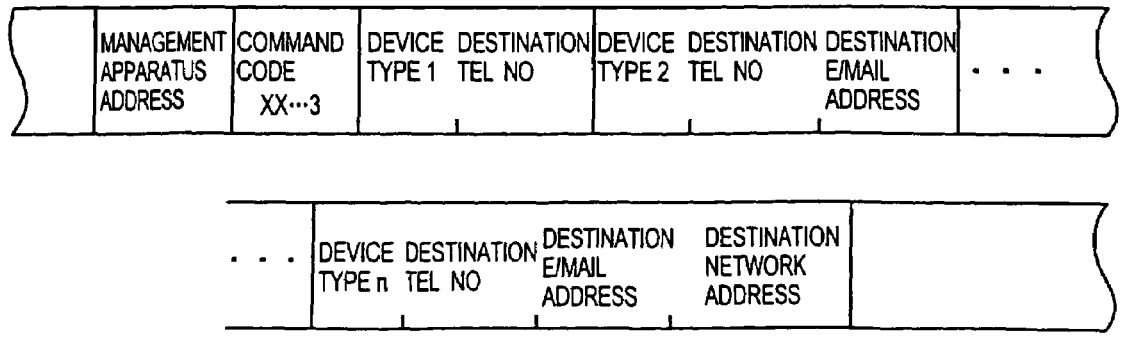

FIG. 13C shows the format of a device-type-basis message destination setting command which is remotely transmitted from the center system 2 to the management apparatus 15. As shown in FIG. 13C, the setting command includes a command code "XX . . . 3", which represents the device-type-basis message destination setting command. A secondary code "X", following the command code, in the setting command represents a specific one of a number of different device types of the image forming devices 10. In the example of FIG. 13C, a new message destination telephone number is included at a location following the secondary code in the setting command for the case of device type 1. Further, in the example of FIG. 13C, a new message destination telephone number and a new message destination e/mail address are included at locations following the secondary code in the setting command for the case of device type 2. Further, in the example of FIG. 13C, a new message destination telephone number, a new message destination e/mail address, and a new message destination network address are included at locations following the secondary code in the setting command for the case of device type 3.

Further, in the present embodiment, when the device-type-basis message destination setting command, sent by the center system 2, is received at the management apparatus 15, the management apparatus 15 updates a device-type-basis message destination table that is retained in the memory of the management apparatus 15, in response to the received command, so as to create a new destination table.

FIG. 14 shows an example of the device-type-basis message destination table used in the image forming device management system of the present embodiment. As shown in FIG. 14, the message destination telephone numbers, the message destination e/mail addresses, or others are defined on a device-type basis in the device-type-basis message destination table. In the present embodiment, the destination of a failure message sent by the management apparatus 15 varies depending on the type of the failing image forming device 10, which is in conformity with the contents of the device-type-basis message destination table currently stored in the management apparatus 15.

Alternatively, as described above, the device-type-basis message destination setting of the management apparatus 15 may be changed from the stored message destination numbers to new message destination numbers in accordance with the operator's manual operation that is locally performed on the management apparatus 15.

The above feature of the image forming device management system is useful to provide flexibility in updating the parameter of the remote maintenance of the image forming devices, which is currently selected by the image forming device management program.

Next, a description will be given of the communication adapter 17 in the customer premise system 1-2 of the image forming device management system of FIG. 3.

By performing the polling process on the management apparatus 15, the communication adapter 17 determines whether the management apparatus 15 is waiting for sending a failure message to the communication adapter 17. When the management apparatus 15 is waiting for sending the failure message and receives the polling sequence sent by the communication adapter 17, the management apparatus 15 transmits the failure message to the PSTN 3 through the communication adapter 17.

When the failure message sent by the management apparatus 15 is received at the communication adapter 17, the communication adapter 17 temporarily stores the received message and senses a vacant state of the telephone line on the PSTN 3. When the telephone line is in a vacant state, the communication adapter 17 transmits the stored message to the PSTN 3. When the telephone line is in a busy state, the communication adapter 17 is waiting for sending the stored message to the PSTN 3. By repeating the sensing of the telephone line at given intervals, the communication adapter 17 establishes a call to the destination station on the PSTN 3 until the telephone line becomes vacant, and then sends the stored message to the PSTN 3.

When the communication adapter 17 fails to transmit the failure message due to a certain problem, the communication adapter 17 sends an error message, indicating the cause of the error, back to the management apparatus 15.

The present invention is not limited to the above-described embodiments, and variations and modifications may be made without departing from the scope of the present invention.

Further, the present invention is based on Japanese priority application No.11-187123, filed on Jul. 1, 1999, and Japanese priority application No.2000-174345, filed on Jun. 9, 2000, the entire contents of which are hereby incorporated by reference.

The invention claimed is:

1. An image forming device management system comprising a customer system and a center system linked by a network, the customer system having a plurality of image forming devices and at least one management apparatus connected onto a LAN at a customer location, the center system having one or a plurality of computers, the image forming device management system comprising:

a monitoring unit, provided in the management apparatus, configured to monitor operating conditions of the image forming devices on the LAN;

a storing unit, provided in the management apparatus, configured to store results of the monitoring of the operating conditions by the monitoring unit;

a failure detecting unit, provided in the management apparatus, configured to detect a failure in any of the image forming devices on the LAN;

a first message unit, provided in the management apparatus, configured to transmit a failure message to the center system via the network when the failure is detected by the failure detecting unit, the failure message including a data provided to identify the failure;

a retrieval unit, provided in the center system, configured to receive the failure message transmitted by the first message unit, and for accessing a database of the center system using the data of the received failure message to produce results of the accessing; and a second message unit, provided in the center system, configured to extract a service department ID from the database based on the accessing results produced by the retrieval unit, and for transmitting a service request message to a service department indicated by the service department ID.

2. The image forming device management system according to claim 1, wherein the management apparatus is configured such that the management apparatus can be selectively set in one of an auto message mode or a manual message mode, and, when the management apparatus is set in the auto message mode, the first message unit is configured to automatically transmit the failure message to the center system upon occurrence of the failure, and, when the management apparatus is set in the manual message mode, the first message unit is configured to transmit the failure message to the center system in response to a manual operation performed on the management apparatus by an operator.

3. The image forming device management system according to claim 2, wherein the management apparatus is configured such that the setting of the management apparatus in one of the auto message mode or the manual message mode can be changed in response to a manual operation performed on the management apparatus by the operator.

4. The image forming device management system according to claim 2, wherein the management apparatus is configured such that the setting of the management apparatus in one of the auto message mode or the manual message mode can be changed in response to a setting command remotely sent to the management apparatus by the center system.

5. The image forming device management system according to claim 1, wherein the center system further includes a maintenance unit configured to change a message destination setting data, stored in the management apparatus, to a new data by remotely transmitting a setting command from the center system to the management apparatus.

6. The image forming device management system according to claim 1, wherein the center system further includes a maintenance unit configured to change a device-type-basis message destination setting data, stored in the management apparatus with respect to respective types of the image forming devices, to a new data by remotely transmitting a setting command from the center system to the management apparatus.

7. The image forming device management system according to claim 1, wherein the customer system further comprises a communication adapter configured to connect the management apparatus through the communication adapter to the network, and a communication line, configured for one of the image forming devices to connect to the network, is shared with the management apparatus by using the communication adapter.

8. The image forming device management system according to claim 5, wherein the message destination setting data stored in the management apparatus includes at least a destination telephone number, and the maintenance unit is configured to change the destination telephone number to a new destination telephone number by remotely transmitting a predetermined destination setting command code to the management apparatus.

9. The image forming device management system according to claim 5, wherein the message destination setting data stored in the management apparatus includes at least a destination electronic mail address, and the maintenance unit is configured to change the destination electronic mail address to a new destination electronic mail address by remotely transmitting a predetermined destination setting command code to the management apparatus.

10. The image forming device management system according to claim 5, wherein the message destination setting data stored in the management apparatus includes at least a destination network address, and the maintenance unit is configured to change the destination network address to a new destination network address by remotely transmitting a predetermined destination setting command code to the management apparatus.

11. A center system for use in an image forming device management system comprising a customer system and the center system linked by a network, the customer system having a plurality of image forming devices and at least one management apparatus connected onto a LAN at a customer location, the center system having one or a plurality of computers, the center system comprising:
   a retrieval unit configured to receive a failure message transmitted by the management apparatus via the network, and for accessing a database of the center system using a data contained in the received failure message so as to retrieve information from the database;
   a message unit configured to extract a service department ID from the database based on the retrieved information, and to transmit a service request message to a service department indicated by the service department ID; and
   a maintenance unit configured to change a message destination setting data, stored in the management apparatus, to a new data by remotely transmitting a setting command from the center system to the management apparatus.

12. A center system for use in an image forming device management system comprising a customer system and the center system linked by a network, the customer system having a plurality of image forming devices and at least one management apparatus connected onto a LAN at a customer location, the center system having one or a plurality of computers, the center system comprising:
   a retrieval unit configured to receive a failure message transmitted by the management apparatus via the network, and for accessing a database of the center system using a data contained in the received failure message so as to retrieve information from the database;
   a message unit configured to extract a service department ID from the database based on the retrieved information, and to transmit a service request message to a service department indicated by the service department ID; and
   a maintenance unit configured to change a device-type-basis message destination setting data, stored in the management apparatus with respect to respective types of the image forming devices, to a new data by remotely transmitting a setting command from the center system to the management apparatus.

13. The center system according to claim 11, wherein the message destination setting data stored in the management apparatus includes at least a destination telephone number, and the maintenance unit is configured to change the destination telephone number to a new destination telephone number by remotely transmitting a predetermined destination setting command code to the management apparatus.

14. The center system according to claim 11, wherein the message destination setting data stored in the management apparatus includes at least a destination electronic mail address, and the maintenance unit is configured to change the destination electronic mail address to a new destination electronic mail address by remotely transmitting a predetermined destination setting command code to the management apparatus.

15. The center system according to claim 11, wherein the message destination setting data stored in the management apparatus includes at least a destination network address, and the maintenance unit is configured to change the destination network address to a new destination network address by remotely transmitting a predetermined destination setting command code to the management apparatus.

16. A management method for an image forming device management system comprising a customer system and a center system linked by a network, the customer system having a plurality of image forming devices and at least one management apparatus connected onto a LAN at a customer location, the center system having one or a plurality of computers, the management method comprising the steps of:
   monitoring operating conditions of the image forming devices on the LAN by the management apparatus;
   storing results of the monitoring of the operating conditions of the image forming devices;
   detecting a failure in any of the image forming devices on the LAN by the management apparatus;
   transmitting a failure message from the management apparatus to the center system via the network when the failure is detected, the failure message including a data provided to identify the failure;
   receiving the failure message, transmitted by the management apparatus, at the center system;
   accessing a database of the center system using the data of the received failure message so as to produce results of the accessing; extracting a service department ID from the database based on the accessing results; and
   transmitting a service request message from the center system to a service department indicated by the service department ID.

17. An image forming device management system comprising a customer system and a center system linked by a network, the customer system having a plurality of image forming devices ad at least one management apparatus connected onto a LAN at a customer location, the center system having one or a plurality of computers, the image forming device management system comprising:
   a monitoring unit provided in said at least one management apparatus and configured to monitor operating conditions of the image forming devices on the LAN;
   a storing unit provided in said at least one management apparatus and configured to store results of the monitoring of the operating conditions by the monitoring unit;
   a failure detecting unit provided in said at least one management apparatus and configured to detect a failure in any of the image forming devices on the LAN;
   a first message unit provided in said at least one management apparatus and configured to transmit a failure message to the center system via the network when the failure is detected by the failure detecting unit, the failure message including a data provided to identify the failure;

a retrieval unit provided in the center system and configured to receive the failure message transmitted by the first message unit, and to access a database of the center system using the data of the received failure message to produce results of the access; and a second message unit provided in the center system and configured to extract a service department ID from the database based on the access results produced by the retrieval unit, and to transmit a service request message to a service department indicated by the service department ID.

18. A management apparatus for use in an image forming device management system comprising a customer system and a center system linked by a network, the customer system having a plurality of image forming devices and the management apparatus connected onto a LAN at customer location, the center system having one or a plurality of computers, the management apparatus comprising:

a monitoring unit monitoring operating conditions of the image forming devices on the LAN;

a storing unit storing results of the monitoring of the operating conditions by the monitoring unit;

a failure detecting unit detecting a failure in any of the image forming devices on the LAN; and a message unit transmitting a failure message to the center system via the network when a failure is detected by the failure detecting unit, the failure message including a data provided to identify the failure; wherein the management apparatus is configured such that the management apparatus can be selectively set in one of an auto message mode or a manual message mode, and, when the management apparatus is set in the auto message mode, the message unit automatically transmits the failure message to the center system upon occurrence of the failure, and, when the management apparatus is set in the manual message mode, the message unit transmits the failure message to the center system in response to a manual operation performed on the management apparatus by an operator.

19. The management apparatus according to claim 18, wherein the management apparatus is configured such that the setting of the management apparatus in one of the auto message mode or the manual message mode can be changed in response to the manual operation performed on the management apparatus by the operator.

20. A device management system comprising a customer system and a center system linked by a network, the customer system having a plurality of devices and at least one management apparatus connected onto a LAN at a customer location, the center system having one or a plurality of computers, the device management system comprising:

monitoring means, provided in the management apparatus, for monitoring operating conditions of the devices on the LAN;

storing means, provided in the management apparatus, for storing results of the monitoring of the operating conditions by the monitoring means;

failure detecting means, provided in the management apparatus, for detecting a failure in any of the devices on the LAN;

first message means, provided in the management apparatus, for transmitting a failure message to the center system via the network when the failure is detected by the failure detecting means, the failure message including a data provided to identify the failure;

retrieval means, provided in the center system, for receiving the failure message transmitted by the first message means, and for accessing a database of the center system using the data of the received failure message to produce results of the accessing; and second message means, provided in the center system, for extracting a service department ID from the database based on the accessing results produced by the retrieval means, and for transmitting a service request message to a service department indicated by the service department ID.

* * * * *